C. E. SHIPP.
PROTECTIVE RUNNER FOR COTTON PICKERS' SACKS.
APPLICATION FILED SEPT. 20, 1921.
1,435,880.
Patented Nov. 14, 1922.
2 SHEETS—SHEET 1.
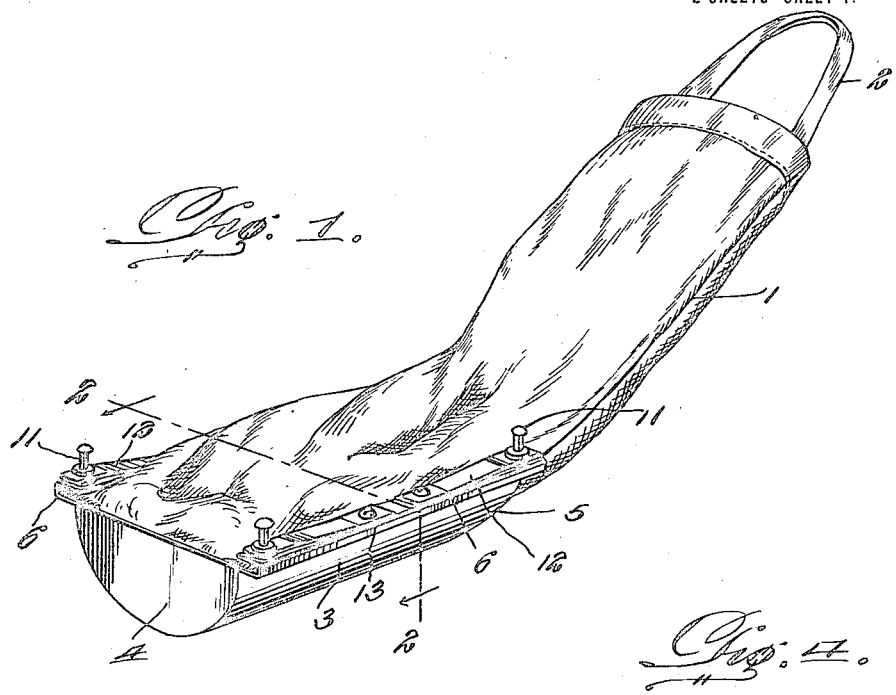
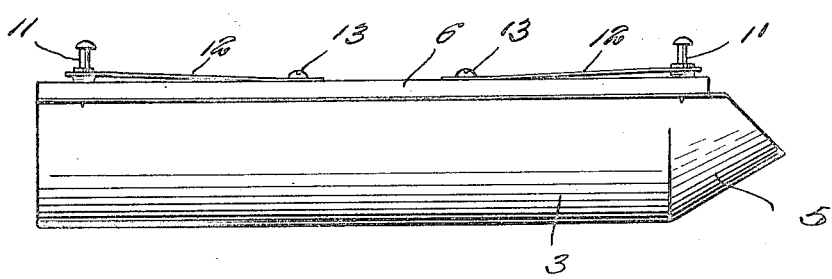
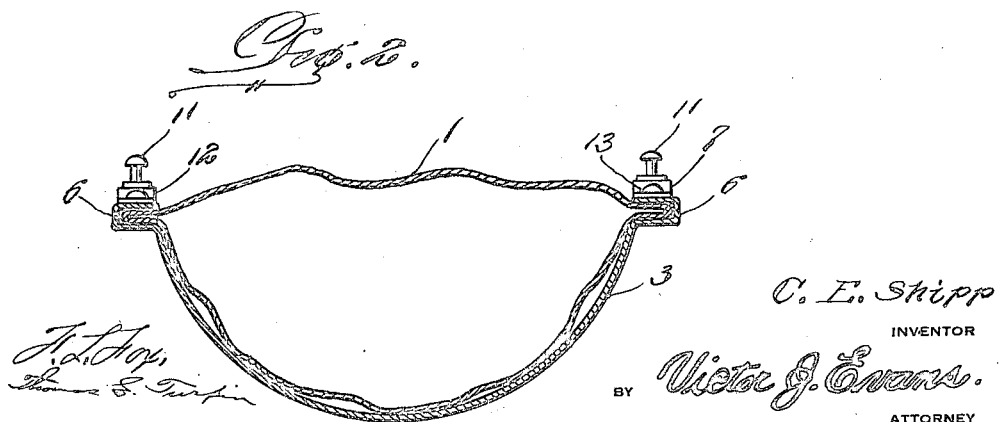
C. E. Shipp
INVENTOR
BY Victor J. Evans
ATTORNEY
WITNESSES:

C. E. SHIPP.
PROTECTIVE RUNNER FOR COTTON PICKERS' SACKS.
APPLICATION FILED SEPT. 20, 1921.
1,435,880.
Patented Nov. 14, 1922.
2 SHEETS—SHEET 2.
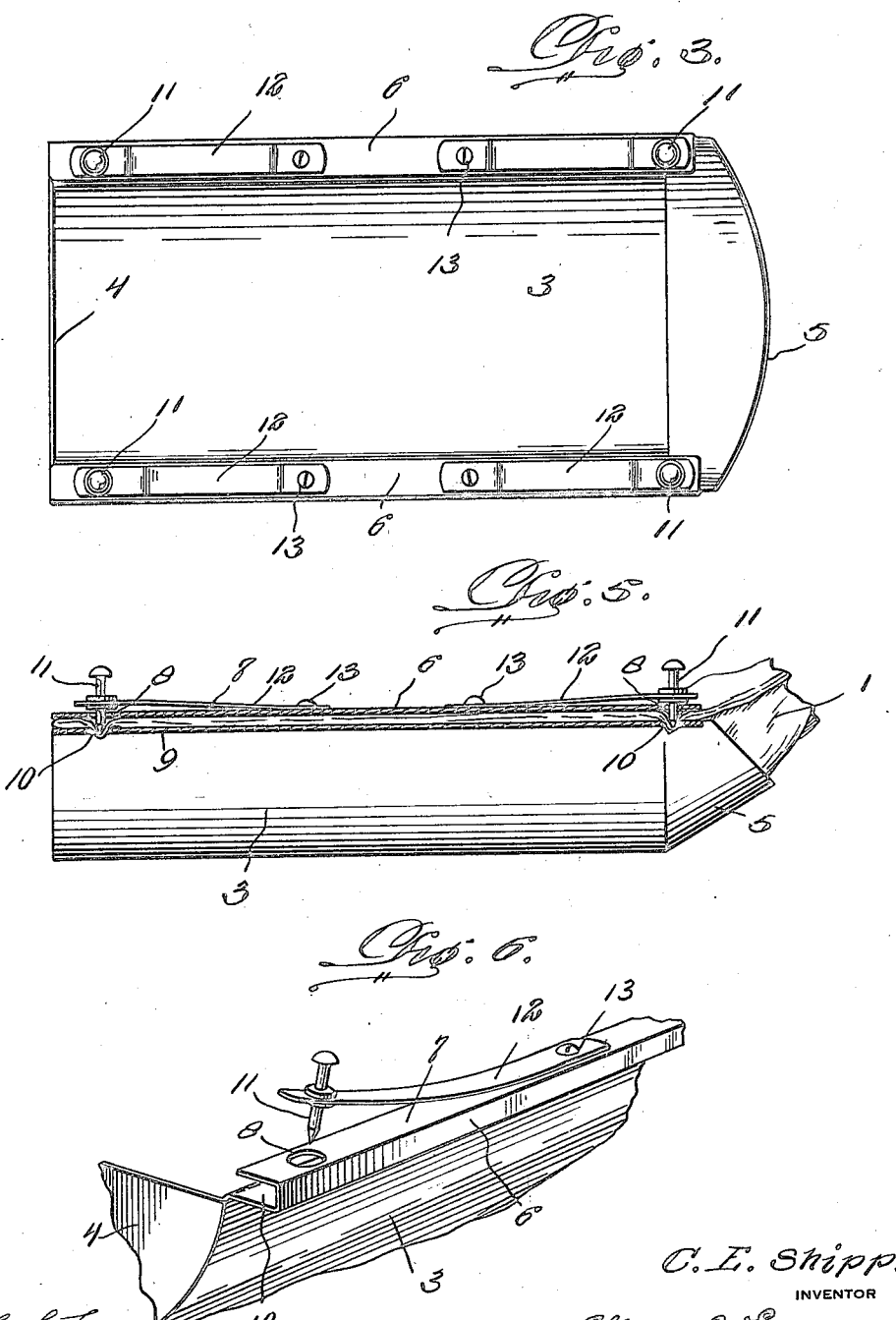

Patented Nov. 14, 1922.

1,435,880

UNITED STATES PATENT OFFICE.

CHARLES E. SHIPP, OF DETROIT, TEXAS.

PROTECTIVE RUNNER FOR COTTON-PICKERS' SACKS.

Application filed September 20, 1921. Serial No. 502,013.

*To all whom it may concern:*

Be it known that I, CHARLES E. SHIPP, a citizen of the United States, residing at Detroit, in the county of Red River and State of Texas, have invented new and useful Improvements in Protective Runners for Cotton-Pickers' Sacks, of which the following is a specification.

The object of my present invention is the provision of an efficient protective runner for cotton pickers' sacks, and one to which sacks may be expeditiously and positively connected so as to enable the runner to be used in succession on a number of sacks.

To the attainment of the foregoing, the invention consists in the improvement as hereinafter described and definitely claimed.

In the accompanying drawings, forming part of this specification:—

Figure 1 is a perspective showing my novel protective runner properly applied to a cotton picker's sack.

Figure 2 is an enlarged transverse section taken in the plane indicated by the line 2—2 of Figure 1 and showing the relative arrangement of the sack and the runner.

Figure 3 is a plan view of the runner per se.

Figure 4 is a side elevation of the runner per se.

Figure 5 is a detail longitudinal vertical section taken through one of the lateral sack receiving portions at the upper edges of the runner.

Figure 6 is a detail view showing one of the sack fasteners of the runner in raised position.

Similar numerals of reference designate corresponding parts in all of the views of the drawings.

The sack 1 is provided with a shoulder strap 2, and is provided with a forward open end and a rear closed end in the ordinary well known manner.

My novel protective runner is designed to be dragged along the ground through the medium of the sack 1, and is adapted to prevent frictional wear of the lower and rear portion of the sack against the ground.

The runner is preferably, though not necessarily, formed of metal, and among its elements it comprises a trough shaped body 3, preferably of galvanized sheet metal. The said body 3 is closed at its rear end by a wall 4, and is open at its forward end and has its said forward end inclined upwardly as indicated by 5 so as to prevent the runner from catching against obstacles in its path. On each of its longitudinal edges the body 3 is provided with lateral outwardly extending sack edge receiving portions 6. These portions 6 are of loop form in cross section and are extended throughout the length of the body 3 and are open at their inner sides as illustrated. The upper walls 7 of the said portions are provided adjacent to their ends with apertures 8, and the lower walls 9 of the portions 6 are provided with apertures 10 in alinement with the said apertures 8. Normally resting in the pairs of apertures 8 and 10 are pointed sack fasteners 11. The said sack fasteners 11 are connected to the free portions of spring strips 12 adjacent to the outer ends of the said strips 12; the strips 12 being arranged in superimposed relation on the upper walls 7 and being connected at their inner ends to the said upper walls 7 by solder, indicated by 13, or any other appropriate means.

In associating a sack such as 1 with my novel runner, it is simply necessary for the operator to arrange the closed end portion of the sack in the runner, and to introduce the edge portions of the sack into the lateral portions 6 of the runner. It is also incumbent on the operator to raise the fasteners 11 against the action of their spring strips 12 so as to place the edge portions of the sack between the apertures 8 and 10, and then when the fasteners 11 are released, they will manifestly force portions of the sack through the lower portions 10 or into said apertures 10 with the result that the sack will be positively connected to the runner, notwithstanding the connection is a detachable one, and at the same time the portions 6 will serve as guards for the edge portions of the sack. Manifestly the fasteners 11 may be manipulated in the manner described in succession, and it will also be appreciated that when it is desired to disassociate the runner from a sack, it is simply necessary for the operator to draw the fasteners 11 upwardly, and pull the sack out of the portions 6 while the fasteners are in their raised positions.

I have entered into a detailed description of the construction and relative arrangement of parts embraced in the present and preferred embodiment of my invention in order to impart a full, clear and exact understanding of the same embodiment. I do not desire, however, to be understood as confining myself to the said specific construction and relative arrangement of parts inasmuch as in the future practice of the invention various changes and modifications may be made such as fall within the scope of my invention as defined in my appended claims.

Having described my invention, what I claim and desire to secure by Letters-Patent, is:—

1. A protective runner for cotton pickers' sacks comprising a trough shaped body having on its longitudinal edges lateral sack edge receiving and protecting portions of loop form in cross-section and open at their inner sides, and fasteners carried by said portions to secure the edge portions of a sack therein.

2. A protective runner for cotton pickers' sacks comprising a trough shaped body having on its longitudinal edges lateral sack receiving portions of loop form in section and open at their inner sides, and fasteners carried by said portions to secure the edge portions of a sack therein; the lower and upper walls of the said portions being apertured, and the fasteners being arranged to normally rest in said apertures, and being carried by spring strips connected at one end to the upper walls of the portions.

In testimony whereof I affix my signature.

CHARLES E. SHIPP.